United States Patent [19]
Bose et al.

[11] 3,959,720
[45] May 25, 1976

[54] VOLTAGE CONTROL SYSTEM FOR HIGH FREQUENCY LINK CYCLOCONVERTER

[75] Inventors: Bimal K. Bose, Troy; Paul M. Espelage, Ballston Lake, both of N.Y.

[73] Assignee: General Electric Corporation, Schenectady, N.Y.

[22] Filed: Apr. 30, 1975

[21] Appl. No.: 573,373

[52] U.S. Cl. .................................. 323/102; 321/7; 323/119
[51] Int. Cl.² ........................................ G05F 5/00
[58] Field of Search ............... 318/179, 227; 321/5, 321/10, 7, 11–14, 60, 65, 69 R; 323/102–107, 117, 119

[56] References Cited
UNITED STATES PATENTS

| | | | |
|---|---|---|---|
| 3,419,785 | 12/1968 | Lafuze | 321/5 X |
| 3,444,450 | 5/1969 | Koppelmann | 321/5 X |
| 3,449,653 | 6/1969 | Koppelmann | 321/5 X |
| 3,551,799 | 12/1970 | Koppelmann | 323/8 |
| 3,742,336 | 6/1973 | Bedford | 321/69 R |
| 3,745,437 | 7/1973 | Brown | 323/8 X |
| 3,768,001 | 10/1973 | Thorborg | 323/102 |
| 3,829,759 | 8/1974 | Thorborg | 323/102 X |
| 3,882,369 | 5/1975 | McMurray | 321/7 X |

Primary Examiner—William M. Shoop
Attorney, Agent, or Firm—Donald R. Campbell; Joseph T. Cohen; Jerome C. Squillaro

[57] ABSTRACT

In a system including an input cycloconverter which operates a high frequency resonant tank circuit from a source of low frequency voltage supplied through an input reactor, with or without an output cycloconverter, an input cycloconverter control method and circuit maintains the tank voltage within predetermined limits for both directions of power flow. An additional feature is that the input power factor is programmable. In the voltage control scheme the cycloconverter reference signals vary with the commanded real power and power factor and respectively control the quadrature and direct components of induced cycloconverter voltage.

19 Claims, 11 Drawing Figures

PHASOR DIAGRAM
FOR REAL POWER CONTROL

Fig. 6a
PHASOR DIAGRAMS FOR POWER FACTOR CONTROL
(LEADING P.F.)
Fig. 6b
(LEADING P.F.)
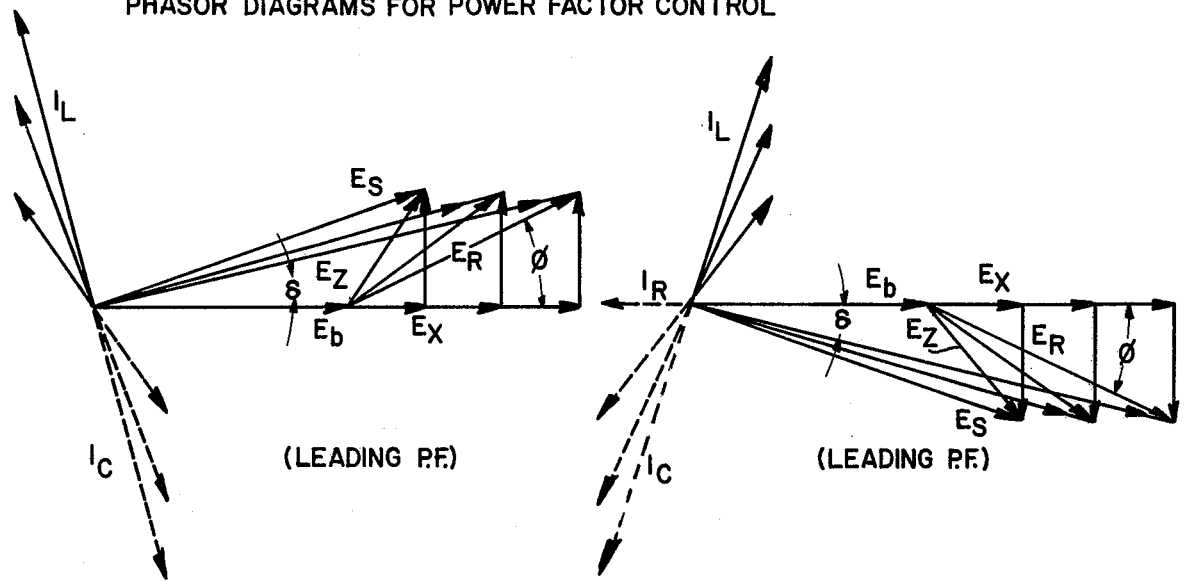
Fig. 7a
(LAGGING P.F.)
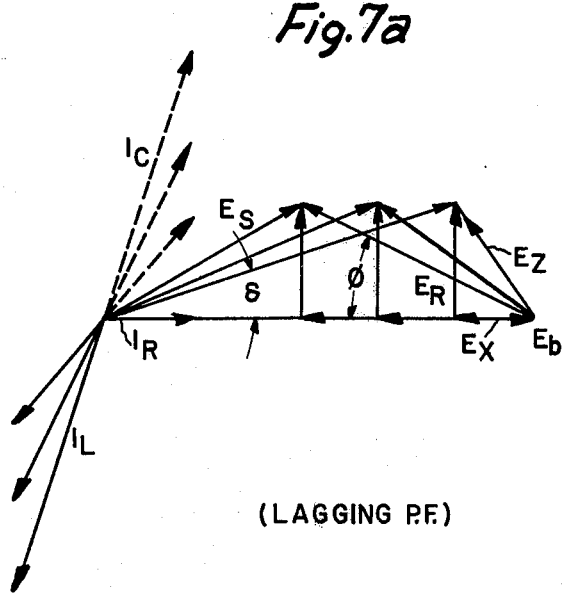
Fig. 7b
(LAGGING P.F.)
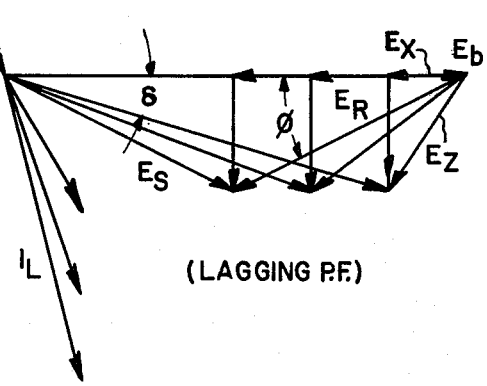

VOLTAGE CONTROL SYSTEM FOR HIGH FREQUENCY LINK CYCLOCONVERTER

BACKGROUND OF THE INVENTION

This invention relates to controlling a high frequency link cycloconverter system, and more particularly to a voltage controller and method for operating a cycloconverter to control power flow to and from a high frequency resonant tank circuit.

The high frequency link cycloconverter system originally disclosed in U.S. Pat. No. 3,742,336 to B. D. Bedford and also in allowed application, Ser. No. 419,490 now U.S. Pat. No. 3,882,369 to W. McMurray, both assigned to the same assignee as this invention, can be considered as an inverse-series connection of two component cycloconverters. Variable commutation energy is provided by operating the linking parallel resonant tank circuit above its resonant frequency since the capacitor power increases and the inductor power decreases as the frequency is raised. In a typical application supplying adjustable voltage and frequency to an ac motor or other inductive load, the output cycloconverter is in the active or motoring mode converting power from the high frequency tuned circuit to a low frequency output, and the input cycloconverter is in the regenerative mode converting 60 Hz polyphase voltage to the high frequency tank. During the regenerative operation of the system when power is returned to the source, the role of the component cycloconverters is reversed.

In this cascaded cycloconverter system, the high frequency tank is a relatively small reservoir of energy compared to the power rating of the whole circuit. Therefore, when the load on the output cycloconverter fluctuates the tank voltage will tend to vary over wide limits. Such a condition is detrimental to the operation of the system. To maintain the tank voltage within the prescribed limit, the control circuit of the input cycloconverter should have fast response characteristics and additionally should be insensitive to supply frequency drift, distortion free, and capable of reversing the direction of power flow in the regenerative operation of the system. It is also desirable to have a programmable power factor at the 60 Hz input line. Many of the same control features are needed for the successful operation of a simplified high frequency link system which does not require the output cycloconverter and can be used as a VAR controller for those applications requiring only reactive power control.

SUMMARY OF THE INVENTION

In a cascaded high frequency link polyphase cycloconverter system with or without an output cycloconverter as just described in which the input cycloconverter operates the high frequency resonant tank circuit from a source of low frequency voltage supplied through a series filter inductor, the input cycloconverter in accordance with the invention has a control circuit for maintaining the tank voltage constant or within predetermined limits for both directions of power flow while optionally permitting independent control of the input power factor.

To this end, the control circuit includes a phase and amplitude shifter which generates per phase cycloconverter reference signals for controlling at least the real power component and direction of power flow through the input cycloconverter in dependence upon the magnitude and polarity of a real power control signal. The instantaneous tank voltage is sensed and compared with a reference to generate a tank voltage error signal used either directly as the real power control signal or as the main component thereof. Preferably the phase and amplitude shifter has provision for an input power factor control, in the form of a manual adjustment or electronically using a control signal of either polarity. The input cycloconverter firing and control means is actuated by the cycloconverter reference signals, preferably by the error between the sensed induced cycloconverter voltage and the reference signal, and effectively regulates the input cycloconverter to maintain the tank voltage within limits. In systems with an output cycloconverter, auxiliary feedback circuits are desirably used to generate dc signals representative of the real power output of the tank and the real component of load current. These are added to the tank voltage error signal and the summation used as the real power control signal to improve the dynamic and static error of the system.

In the voltage control system, the generated per phase cycloconverter reference signals are phase and amplitude shifted with respect to the line voltage used as a reference phasor as determined by the real power control and the independently used input power factor control. The control system operates to adjust the quadrature and direct components of induced cycloconverter voltage, with the direction of power flow and magnitude of real power being determined by the sign and amplitude of the quadrature component, and the sign and amplitude of power factor being determined by the sign and amplitude of the direct component.

The method of controlling the input cycloconverter in a high frequency link system is in accordance with the foregoing techniques and requires no further explanation.

BRIEF DESCRIPTION OF THE DRAWINGS

FIGS. 4–7 are phasor diagrams illustrating the theoretical basis for real power control and input power factor control;

DESCRIPTION OF THE PREFERRED EMBODIMENT

Figure 1:
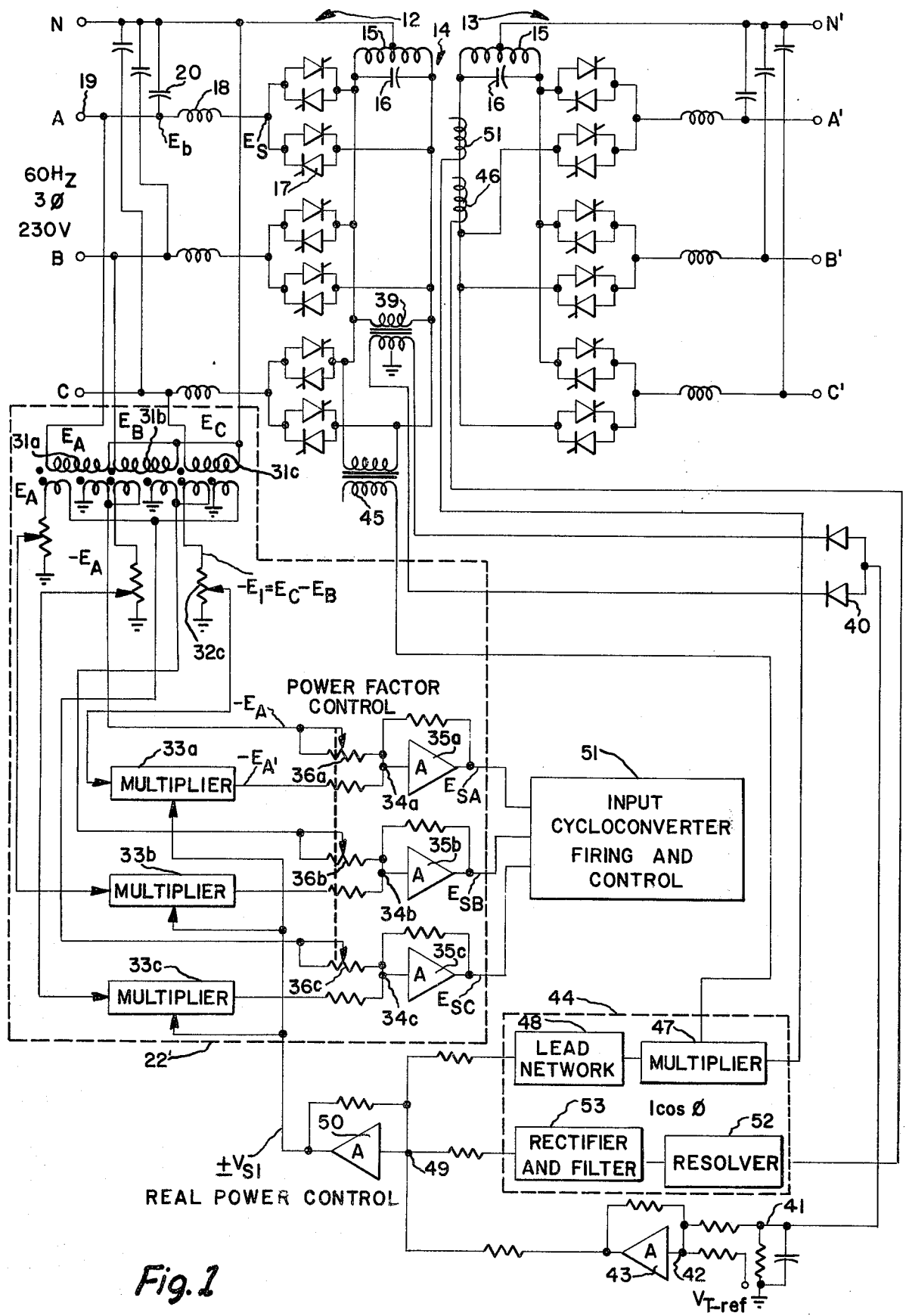
FIG. 1 is a schematic circuit diagram partially in block diagram form of a high frequency link cycloconverter system with wye-connected input and output cycloconverters and an input cycloconverter control circuit as herein taught.

The cascaded high frequency link cycloconverter system can be constructed in either Δ-connected or wye-connected versions as is illustrated in FIGS. 14 and 15 of the previously mentioned U.S. Pat. No. 3,882,369, to which the reader may refer for further information. In FIG. 1, the wye-connected cycloconverter system in its preferred form includes twelve-thyristor input and output cycloconverters 12 and 13, each comprising three single phase-to-single phase cycloconverters separated by a high frequency tank 14 or parallel resonant L-C commutation circuit operated at an adjustable frequency above its resonant frequency. The tuned high frequency tank circuit 14 more particularly utilizes a single combined reactor-coupling transformer 15 having center-tapped primary and secondary windings across each of which is coupled a commutating capacitor 16. In input cycloconverter 12, one pair of inverse-parallel thyristors 17 in each phase is effectively connected to one junction of the high frequency resonant tank 14 while the other pair of thyristors is effectively connected to the other junction, and both pairs are connected through a series reactor 18 to one of the input terminals 19. The input filter also includes three filter capacitors 20 provided between the respective input terminals 19 and the neutral terminal N. The output side cycloconverter and filter are identical to the input side but connected in mirror image fashion. In a typical application of this cycloconverter system as a variable speed ac motor drive, the source is a three phase, 60 Hz, 230 volts supply, the high frequency tank is operated at about 2–4 kHz, and the adjustable voltage, three phase output at the load has a variable frequency between 0–300 Hz.

When supplying power to the load, the input regenerating cycloconverter 12 operates the tuned high frequency tank 14 directly from the polyphase ac supply at a frequency above its resonant frequency, the amount of available commutating energy being determined by the tank freqency. In the case of power flow in a direction from the load to the source, the input cycloconverter 12 is controlled in conventional fashion and operates in a rectifying mode to return power to the supply. Since the input cycloconverter 12 and output cycloconverter 13 operate independently and the output cycloconverter operates in a conventional manner, the voltage control system herein described is for the input unit only. This control scheme essentially regulates the input cycloconverter to maintain the high frequency tank voltage constant or within predetermined limits, and an additional feature is that preferably the input power factor is programmable. As was previously mentioned, the high frequency resonant tank 14 is a relatively small reservoir of energy and the tank voltage tends to vary over wide limits when the load on the output cycloconverter fluctuates. Too high a tank voltage can damage or exceed the ratings of the components, while too low a tank voltage can result in excessive input currents for much the same reason as when the back emf of a synchronous machine is low. In the synchronous machine analogy, to be explained in detail later, using phase A by way of illustration, the phasor summation of the per phase sine wave line voltage $E_b$ at the input terminal 19 and the voltage produced across the reactor 18 is the induced voltage $E_s$ of the input cycloconverter. In the voltage control system according to the invention, the input cycloconverter control circuit shown at the bottom of FIG. 1 maintains the phase and amplitude of the induced voltage $E_s$ so that the high frequency tank voltage is within the prescribed limits for both directions of power flow, with optional provision for input power factor control. With respect to the line voltage used as a reference, the direction and amount of power flow are respectively determined by the sign and amplitude of the quadrature component of voltage, while the sign and amplitude of the power factor are respectively determined by the sign and amplitude of the direct component of voltage. As is evident in FIG. 2 to those skilled in the art, the per phase cycloconverter reference signals $E_{s\text{-}ref}$ to satisfy this control scheme and mode of operation are employed in conventional fashion in the input cycloconverter firing and control circuit, using the cosine firing wave phase control technique, to generate appropriately timed firing pulses for the thyristor switches.

Before proceeding further, the synchronous machine analogy and the theoretical basis for the construction and operation of the phase and amplitude shifter, an essential component of the input cycloconverter control circuit, will be explained with regard to FIGS. 3–8. In the diagram shown in FIG. 3 of a cycloconverter analogy to a synchronous machine operating on infinite bus or from a "stiff" source, 60 Hz power is supplied through reactor $X_s$ (i.e., filter inductor 18) to to the cycloconverter. For simplicity the impedance $X_s$ is assumed to be purely reactive, and $E_b$ and $E_s$ are as previously identified in FIG. 1. Following the synchronous machine analogy, $I_c$ is the current flowing in a direction from the cycloconverter to the source, and $I_L = -I_c$ is the current flowing from the source to the cycloconverter.

Figure 4:
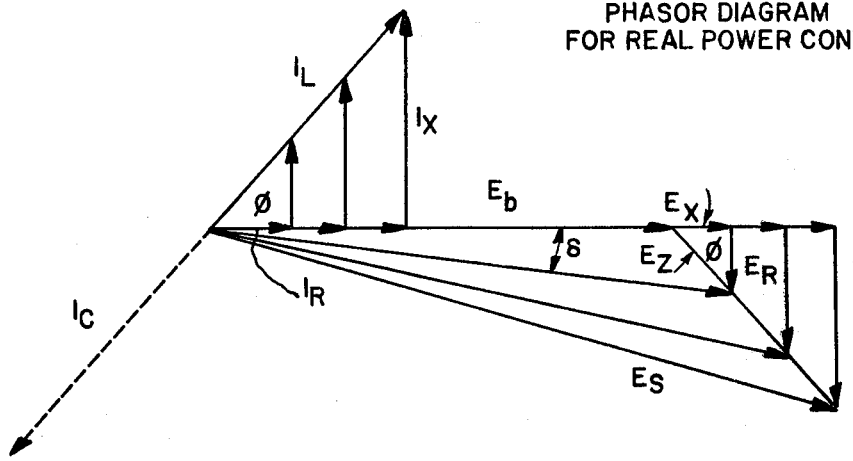

Referring now to FIG. 4 which gives the phasor diagram for real power control as herein described, the induced voltage phasor $\bar{E}_s$ can be constructed as $$\bar{E}_s = \bar{E}_b + \bar{E}_z = \bar{E}_b + \bar{E}_x + \bar{E}_R,$$

where $$\bar{E}_z = \bar{I}X_s,\ \bar{E}_x = \bar{I}_x\, X_s,\ \text{and}\ \bar{E}_R = I_R X_s.$$

Figure 5:
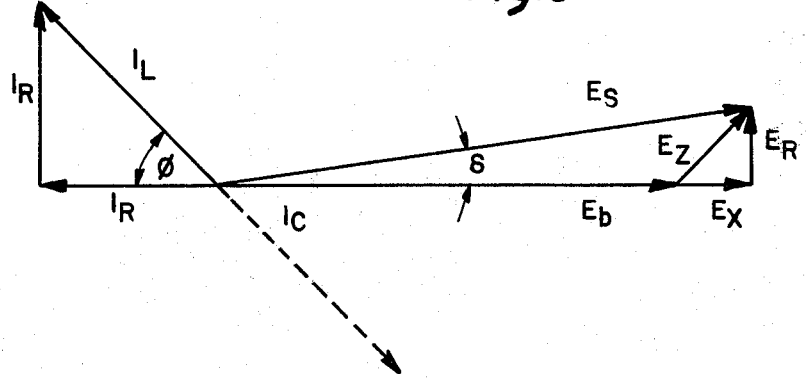

Therefore, when the $\bar{E}_z$ phasor is constructed at a fixed angle and its amplitude is modulated as illustrated in FIG. 4, the real power will be modulated maintaining the input power factor constant. It will be noted that FIG. 4 is drawn with respect to the line current $I_L$, in which case the angle $\delta$ between $\bar{E}_b$ and $\bar{E}_s$ is less than zero and power flow is from the source to the cycloconverter. As shown in FIG. 5, when $E_z$ is constructed in the first quadrant by reversing $\bar{E}_R$, the cycloconverter will revert from the inverting or regenerative mode to the rectifying or active mode, and real power flows in the other direction from the cycloconverter to the source. It is noted in FIG. 5 that the angle $\delta$ is greater than zero and that the power flow reverses as compared to FIG. 4 since $I_L$ is constructed in the second rather than in the first quadrant. FIGS. 6a and 6b show the phasor diagrams for leading input power factor control, while FIGS. 7a and 7b apply to lagging power factor control. To modulate the input power factor, conventionally defined as cos $\phi$, the phasor $\bar{E}_x$ is modulated (see FIG. 6a) to control the input power factor while maintaining the real power constant. As the phasor $\bar{E}_R$ remains constant for the several cases illustrated, the angle $\phi$ changes, and therefore the input power factor. As shown in FIGS. 6a and 7a, the input power factor changes from the leading to the lagging region as $\bar{E}_x$ changes sign. FIGS. 6a and 7a are both for the case of cycloconverter to source power flow, while FIGS. 6b and 7b are both for the case of source to cycloconverter power flow. In all of these phasor diagrams the angle $\delta$ between the reference line voltage $E_b$ and the desired induced voltage $E_s$ is assumed to be small.

Figure 8:
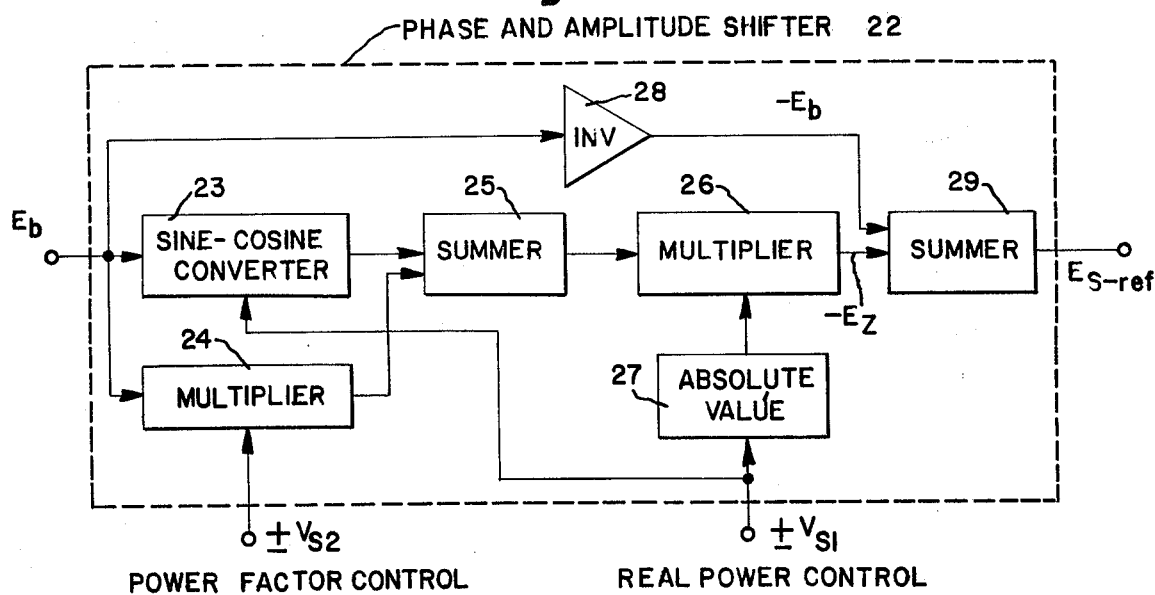
FIG. 8 is a block diagram of a phase and amplitude shifter for generating cycloconverter reference signals for independently controlling real power and input power factor using dc control signals of either polarity.

FIG. 8 shows a simple phase and amplitude shifter 22 for generating single phase cycloconverter reference voltage signals which can control the real power and input power factor of the cycloconverter independently and linearly by dc signal voltages. The phase shifter circuit is insensitive to bus or line voltage frequency drift, is distortion free, and has an almost instantaneous response characteristic. In addition, the real power and power factor angle can be changed to either polarity by simply reversing the polarity of the dc control signals. Of course, for a three phase shifter three of the single phase circuits shown in FIG. 8 are required. Ordinarily, the signal levels are reduced by the gain factor of the cycloconverter, and thus the per phase input sine wave line voltage signal $E_b$ is preferably obtained in the case of the FIG. 1 system by means of a step-down potential transformer directly coupled between one input terminal 19 and the neutral terminal N. The input line voltage signal (see FIG. 8) is converted to a cosine wave of proportional amplitude using a frequency insensitive sine-cosine converter 23, such as the device described in the copending application Ser. No. 561,592 by the inventors, entitled "Frequency Insensitive Sine Wave-to-Cosine Wave Converter", filed on Mar. 24, 1975, and assigned to the same assignee as this invention. This converter employs the trigonometric relationship $\cos \omega t = \sqrt{1-\sin^2 \omega t}$ and is operative over a wide frequency range with an almost instantaneous response characteristic to produce cosine waves with an amplitude proportional to the sine wave amplitude. In one form implemented with presently available integrated circuits, the converter includes an analog multiplier for generating a sine wave squared signal, a clamping circuit for effectively shifting the voltage level, a sign inverter for generating a cosine wave squared signal, a square rooter for producing a negative-going full wave rectified cosine wave, a second sign inverter, and a polarizer for converting the positive-going full wave rectified cosine wave to the desired ac cosine wave. Another suitable prior art technique for frequency insensitive cosine wave generation involves integrating the sine wave and then multiplying the amplitude of the cosine wave by a voltage proportional to the frequency. The dc real power control signal $v_{s1}$ is used as a polarity reversing signal for sine-cosine converter 23, and thus when $v_{s1}$ is negative a negative cosine wave is generated. In a parallel branch, $E_b$ is fed to an analog four-quadrant multiplier 24 used as a variable gain amplifier, the second input to the multiplier being the dc power factor control signal $v_{s2}$ which can be of either polarity depending upon whether a leading or lagging power factor is desired. The resulting variable amplitude sine wave has a peak amplitude and polarity depending upon the magnitude and polarity of $v_{s2}$, and is combined with the frequency insensitive cosine wave in summer 25 to generate at its output a summation signal. In terms of the phasor diagram for power factor control in FIG. 6, the in-phase sine wave signal (indicative of $\overline{E}_x$) is multiplied or modulated according to the desired power factor, while the cosine wave signal (indicative of $\overline{E}_R$) remains constant, the two being summed preferably using an operational amplifier to obtain the summation signal (indicative of $\overline{E}_z$).

To implement the real power control, the output of summer 25 is fed to an analog two-quadrant multiplier 26, the second input to this multiplier being the absolute value of the real power control signal $v_{s1}$. A circuit 27 is used to invert the negative polarity dc signal since $v_{s1}$ is of either polarity depending upon the commanded direction of power flow through the cycloconverter. In terms of the phasor diagram for real power control given in FIG. 4, the effect of using multiplier 26 is to vary the amplitude of the input summation signal according to the magnitude of $v_{s1}$. As the final step, the signal $-E_b$ produced by sign inverter 28 is combined with the variable amplitude summation signal representative of $-E_z$ using a second operational amplifier summer 29. The output is the desired phase and amplitude shifted cycloconverter reference voltage $E_{s-ref}$. It is obvious that the input power factor and real power can be electronically adjusted independently of one another, and that either may be held constant while varying the other.

Figure 9:
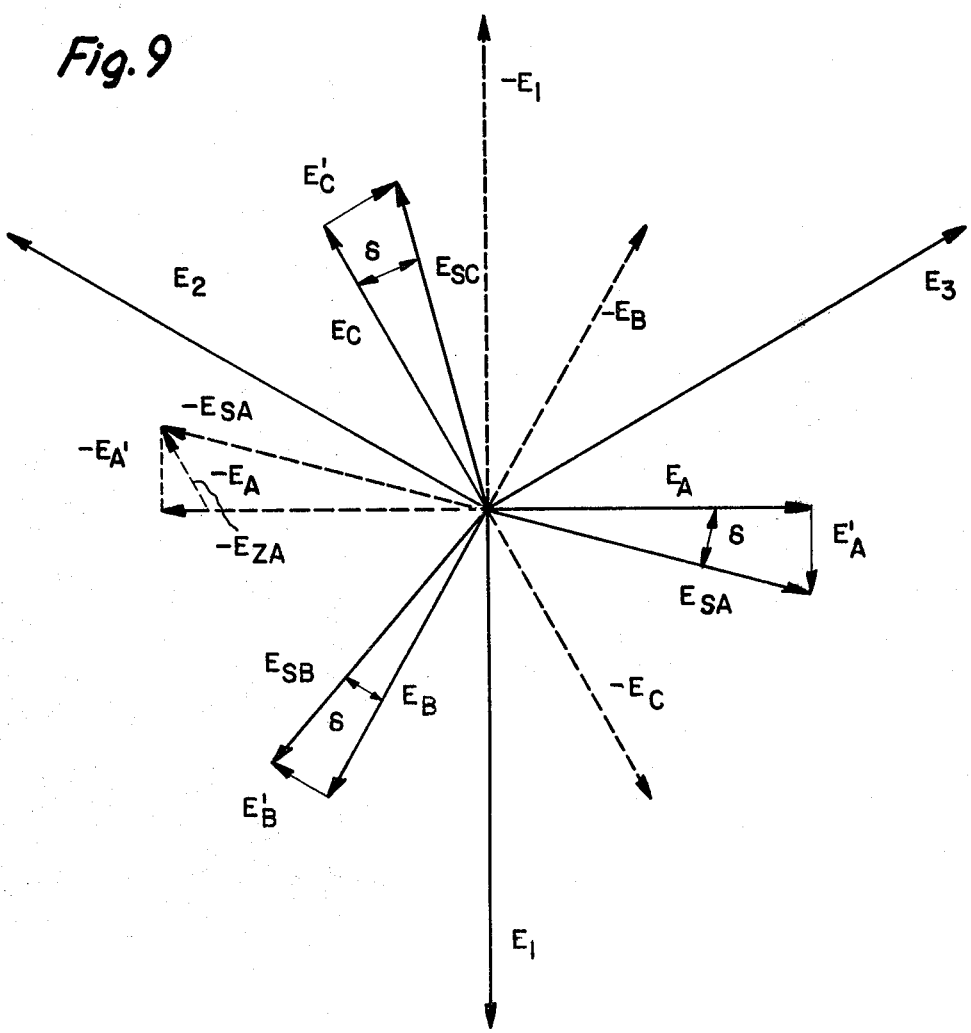
FIG. 9 is a phasor diagram useful in explaining operation of the different form of phase and amplitude shifter for a balanced three phase supply shown in FIGS. 1 and 2.

As a special case when the three phase power supply is balanced in amplitude and phase, the cosine wave or frequency insensitive $E_b < 90$ phasor can be generated conveniently by the addition and subtraction of the phase voltages. FIG. 1 shows the complete phase and amplitude shifter circuit 22' for a balanced system with provision for real power control and optional input power factor control in either the leading or lagging direction. Alternatively, the input power factor may be always fixed at unity. FIG. 9 gives the phasor diagram used to explain the basis of operation of the phase shifter circuit in FIG. 1 (also see FIG. 2). To obtain the frequency insensitive cosine wave for each phase, as well as each single phase line voltage, three step-down transformers 31a, 31b, and 32c have their primary windings respectively connected between each input line and neutral. Each single phase transformer has a split secondary winding such that one gives the positive polarity phase voltage while the other gives the negative polarity phase voltage, e.g., $E_C$ and $-E_C$. The circuit for producing the phase A cycloconverter reference signal $E_{sA}$ will be explained by way of illustration, the other two phases being similar so that corresponding components in the three phases are indicated by corresponding numerals. To obtain the frequency insensitive 90° phase shifted cosine wave (in FIG. 9, see the phasor $-\overline{E}_1$ which is perpendicular to the reference line voltage phasor $\overline{E}_A$), the appropriate secondary windings of transformers 31b and 31c are connected to obtain a voltage signal representing $E_C-E_B$ which by phasor addition gives $-E_1$. To this end, as is illustrated, the dot end of the appropriate secondary winding of transformer 31b is grounded while the outer end is connected to the undotted end of the appropriate secondary winding in transformer 31c. The dot or positive polarity end of this latter secondary winding is coupled directly to a potentiometer 32c for deriving at the wiper a proportional voltage to be supplied as one input to the analog four-quadrant multiplier 33a. The positive or negative polarity real power control signal $v_{s1}$ in accordance with the invention is a high frequency tank voltage error signal representing the difference between actual and desired values of tank voltage, and is the second input to the multiplier 33a so as to generate at the output of the multiplier a cosine wave with a modulated amplitude representing the signal $-E_A'$. This cosine wave with a polarity and peak amplitude depending upon the polarity and magnitude of the real power control signal is fed through an input resistor to the summing junction 34a of an operational amplifier 35a connected as a summing amplifier. The other input to summing junction 34a is the negative-going sine wave line voltage $-E_A$ or a fraction thereof as determined by the setting of a potentiometer 36a used for power factor control. The potentiometer 36a is also used as an input resistor to the summing junction and is ganged with the other phase potentiometers 36b and 36c. This technique for controlling the input power factor is shown shcematically in FIG. 9 since in effect modulating the magnitude of the $-\bar{E}_A$ phasor results in modulating the in-phase component of $-\bar{E}_{zA}$ while maintaining constant the quadrature component $-\bar{E}_A'$ to effect input power factor control as taught in FIG. 6. Due to the inverting characteristic of summing amplifier 35a, the output cycloconverter reference signal generated by summing amplifier 35a is the desired positive polarity signal $E_{sA}$. The respectively 120° displaced cycloconverter reference signals $E_{sB}$ and $E_{sC}$ are obtained at the outputs of the other channels. A unity or leading or lagging input power factor is set by moving the wipers of the ganged potentiometers 369–36c to the appropriate positions, and can be replaced by simple input resistors to achieve a unity power factor without the adjustability feature. For electronic power factor control, potentiometers 36a–36c can be replaced by two-quadrant multipliers used as variable gain amplifiers. Then for gain = 1, PF = 1; for gain > 1, PF = leading; and for 0 < gain < 1, PF = lagging. Suitable multiplier and operational amplifier components for this special case phase shifter are the AD420 integrated circuit manufactured by Analog Devices, Inc., of Norwood, Mass., and the μA741C integrated circuit manufactured by Fairchild Camera and Instrument Corp. of Mountain View, Calif. In the present input cycloconverter voltage control system, the general application phase and amplitude shifter 22 shown in FIG. 8 can be substituted for the modified form just described which is suitable for manual setting of the input power factor.

As was mentioned, the voltage control system essentially regulates the input cycloconverter to maintain the high frequency tank voltage constant or within predetermind limits. To this end, the main control loop senses the instantaneous tank voltage, converts this ac voltage to a dc voltage, and compares the dc voltage with a predetermined reference voltage to produce the tank voltage error signal which actuates the phase and amplitude shifter 22' directly or is the main component of the real power control signal. A suitable voltage sensor is used to sense the high frequency tank voltage, such as the potential transformer 39 shown in FIG. 1 coupled across the input circuit tank components and having a grounded center tap secondary winding the opposite ends of which are connected to alternately conductive diodes 40 to produce a full wave rectified ac voltage. A corresponding dc voltage is generated as by using a resistor-capacitor peak detector 41 and fed through an input resistor to the summing junction 42 of an operational amplifier 43 connected as a summing amplifier. The other input to the summing junction 42 is a preselected dc reference tank voltage $V_{T-ref}$. The tank voltage error signal at the output of operational amplifier 43 is either positive or negative depending upon the magnitude of the sensed actual tank voltage as compared to the reference tank voltage, and can be used directly as the real power control signal $v_{s1}$. Thus, the direction of power flow through the input cycloconverter changes depending upon the polarity of the tank voltage error signal.

Usually, it is desirable to decrease the voltage gain requirement of the main control loop by employing one or more auxiliary feedback control circuits responsive to other appropriate high frequency tank and power circuit parameters such as the real or actual power output of the tank and the real component of load or tank current. In terms of the synchronous machine analogy, these are grouped together and also called the load compounding auxiliary feedback circuits 44. To improve the stability and dynamic error of the system, an additional signal proportional to the real power output of the tank is fed into the main control loop through a lead network. For this purpose, an additional potential transformer 45 is connected in the same manner as transformer 39 to sense the instantaneous tank voltage at the input circuit side, while at the output circuit side the instantaneous load current is sensed by a suitable current transformer 46. Sensor signals representative of the tank voltage and load current are supplied as the two inputs to an analog four-quadrant multiplier 47 used as a real power transducer. The variable frequency output of the multiplier is preferably filtered and fed through a voltage follower (not here illustrated) to a capacitor-resistor lead network 48. The resulting tank real power output signal has a leading phase shift as compared to the input signals to the circuit which by nature of the circuit design increases sharply above a preselected cross-over frequency. To combine the tank real power output signal with the tank voltage error signal, both are fed through input resistors to the summing junction 49 of another operational amplifier 50 connected as a summing amplifier. The output of operational amplifier 50 is the real power control signal $v_{s1}$. In operation, this auxiliary feedback loop is responsive to the rate of change of power and produces an increased output when the rate exceeds a predetermined level. As a result, the real power control signal $v_{s1}$ has an anticipatory change in a direction to regulate the tank voltage within the prescribed limits.

Figure 2:
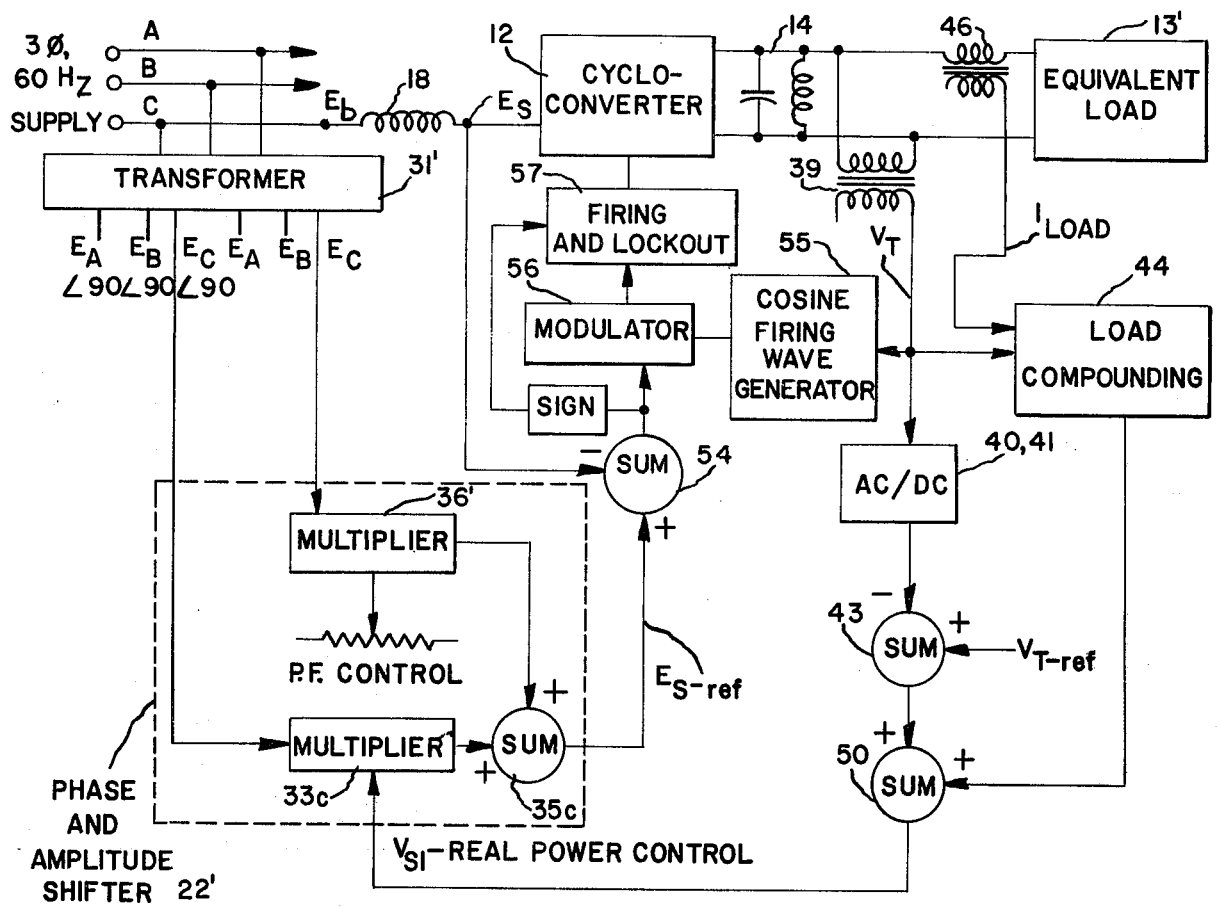
FIG. 2 is a simplified block diagram of the converter system and input cycloconverter control circuit, showing the output cycloconverter as an equivalent load and a single phase of the input cycloconverter control circuit in further detail than in FIG. 1.
Figure 3:
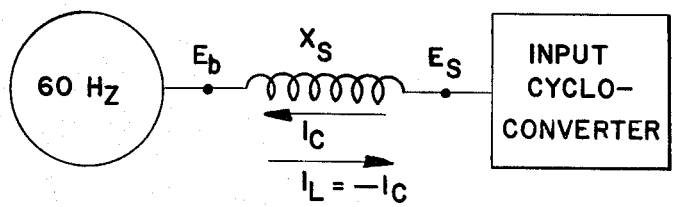
FIG. 3 shows diagrammatically a cycloconverter analogy to a synchronous machine.

A second auxiliary feedback control circuit is preferably provided to correct the static error of the system and generates a dc signal proportional to the real component of tank or load current. Thus, an additional load current transformer 51 is provided at the output side for sensing the instantaneous load current, the sensor signal being fed to a resolver 52 to produce at its output a signal representing $I_{load} \cos \phi$. After being fed through a filter and rectifier circuit 53, the resulting dc real load current component signal is supplied as an additional input to the summing junction 49. Consequently, excursions of the real current component above a predetermined level increasingly change the real power control signal $v_{s1}$ in a direction to regulate the tank voltage. Although in the preferred embodiment the real power control signal has three components, it will be understood that the main component is the tank voltage error signal. As was mentioned, the input cycloconverter firing and control circuitry 51 actuated by the three per phase cycloconverter reference voltages is of conventional design and is illustrated in somewhat more detail in FIG. 2. In FIG. 2, the input filter is shown schematically and partially omitted, the high frequency resonant tank 14 is shown in its simplest form, and the output cycloconverter and filter is illustrated diagrammatically as the equivalent load 13'. Only a single phase of the phase and amplitude shifter 22' is illustrated schematically, as is the three phase transformer 31' for generating the input sine wave line voltage signals and the 90° phase shifted cosine wave signals. As was indicated, multiplier 36' for power factor control can be either a potentiometer for manual adjustment or an analog multiplier for electronic power factor control. The main components of the main and auxiliary control loops for generating the composite real power control signal are designated by the same numerals. To further explain the input cycloconverter firing and control circuitry, the appropriately phase and amplitude shifted cycloconverter control signals $E_{s\text{-}ref}$, which commands the induced voltage $E_s$ to be produced, is compared with a per phase sensed induced voltage $E_s$ using a summer 54 to derive an error voltage for driving the input cycloconverter firing circuits. In order to use the cosine firing wave phase control method of control, the instantaneous tank voltage signal $V_T$ derived from the potential transformer 45 or a similar transformer is fed to a frequency insensitive cosine firing generator 55 preferably of the type described in the previously mentioned application, Ser. No. 561,592. In the modulator 56, as is known in the art, the successive intersections of the induced voltage error signal with the high frequency cosine firing waves are continuously determined to time the generation of SCR firing pulses by the firing and lockout circuitry 57. Depending upon the commanded direction of power flow through the input cycloconverter, one SCR in each inverse-parallel pair is locked out according to the sign of the induced voltage error signal. For further information on thyristor firing control using the cosine firing wave technique, the reader is referred to the book "The Theory and Design of Cycloconverters" by William McMurray, The MIT Press, Cambridge, Mass., copyright 1972 (Library of Congress Catalog Card No. 70-178121); with regard to phase and amplitude shifters 22 and 22', see copending application Ser. No. 562,338 by the inventors entitled "Phase Shifter for Controlling the Power Components and Power Factor of a Cycloconverter," filed on Mar. 26, 1975 and assigned to the same assignee.

The basic high frequency link cycloconverter system shown in FIG. 2 can be used as a static VAR controller assuming that the equivalent load 13' is a simple resistive load representing the losses in the system. In this case, the load compounding auxiliary feedback circuits 44 are not required and the real power control signal $v_{s1}$ controlling the phase and amplitude shifter 22' is simply the tank voltage error signal produced by summer 43. When properly controlled, a static VAR controller of this type can provide leading as well as lagging reactive power control. For further information, reference may be made to the concurrently filed allowed application Ser. No. 573,372 by Paul M. Espelage, assigned to the same assignee as this invention.

While the invention has been particularly shown and described with reference to preferred embodiments thereof, it will be understood by those skilled in the art that various changes in form and details may be made therein without departing from the spirit and scope of the invention.

The invention claimed is:

1. A cycloconverter system comprising
a polyphase cycloconverter circuit in cascade with a high frequency resonant tank circuit and having in each phase an input series filter inductor connectable to a source of low frequency line voltage,
voltage sensor means for sensing the instantaneous tank voltage and deriving a sensor signal indicative thereof, and
a control circuit for controlling said cycloconverter to maintain the tank voltage within predetermined limits for both directions of power flow,
said control circuit including phase and amplitude shifter means for generating per phase cycloconverter reference signals for controlling at least the real power component and direction of power flow through the cycloconverter in dependence upon the magnitude and polarity of a real power control signal, means for comparing said tank voltage sensor signal to a reference voltage and generating a tank voltage error signal used at least as the main component of the real power control signal, and firing and control means actuated by said cycloconverter reference signals for controlling said cycloconverter to maintain the tank voltage within the predetermined limits.

2. A cycloconverter system according to claim 1 wherein said phase and amplitude shifter means further includes input power factor control means so that the generated per phase cycloconverter reference signals control both the real power and input power factor of the cycloconverter.

3. A cycloconverter system according to claim 1 wherein said phase and amplitude shifter means further is independently controlled in dependence upon the magnitude and polarity of a unidirectional voltage input power factor control signal so that the generated per phase cycloconverter reference signals control both the real power and input power factor of the cycloconverter.

4. A cycloconverter system according to claim 1 further including a second polyphase cycloconverter circuit in cascade with said high frequency resonant tank circuit and supplied with load current therefrom,
current sensing means for sensing the instantaneous load current and deriving a sensor signal indicative thereof,
an auxiliary feedback circuit which utilizes said load current sensor signal to derive a real load current signal representative of the real component of load current, and
means for summing said tank voltage error signal and real load current signal and using the summation as the real power control signal.

5. A cycloconverter system according to claim 4 wherein said auxiliary feedback circuit comprises a current resolver having as the input said load current sensor signal, and a rectifier and filter connected to the output of said current resolver and generating said real load current signal.

6. A cycloconverter system according to claim 1 further including a second polyphase cycloconverter circuit in cascade with said high frequency resonant tank circuit and supplied with load current therefrom,
a current sensing means for sensing the instantaneous load current and deriving a sensor signal indicative thereof,
an auxiliary feedback circuit which utilizes said load current and tank voltage sensor signals to derive a tank real power output signal representative of the real power output of said tank circuit, and means for summing said tank voltage error signal and tank real power output signal and using the summation as the real power control signal.

7. A cycloconverter system according to claim 6 wherein said auxiliary feedback circuit comprises a multiplier having as inputs said load current and tank voltage sensor signals, and a lead network connected to the output of said multiplier and generating said tank real power output signal.

8. A cycloconverter system according to claim 1 further including a second polyphase cycloconverter circuit in cascade with said high frequency resonant tank circuit and supplied with load current therefrom,
  current sensing means for sensing the instantaneous load current and deriving a sensor signal indicative thereof,
  a first auxiliary feedback circuit which utilizes said load current sensor signal to derive a first feedback signal representative of the real component of load current,
  a second auxiliary feedback circuit which utilizes said load current and tank voltage sensor signals to derive a second feedback signal representative of the real power output of said tank circuit, and
  means for summing said tank voltage error signal and first and second feedback signals and using the summation as the real power control signal.

9. A high frequency link cycloconverter system comprising
  cascaded input and output polyphase cycloconverter circuits linked by a high frequency resonant tank circuit, said input cycloconverter having in each phase a series filter inductor connectable to a source of low frequency line voltage,
  voltage sensor means for sensing the instantaneous tank voltage and deriving a sensor signal indicative thereof, and
  an input cycloconverter control circuit for effectively controlling the induced voltage in each phase between the filter inductor and input cycloconverter and for maintaining the tank voltage within predetermined limits for both directions of power flow,
  said input cycloconverter control circuit including phase and amplitude shifter means for generating per phase cycloconverter reference signals for controlling at least the real power component and direction of power flow through the input cycloconverter in dependence upon the magnitude and polarity of a real power control signal, means for summing said tank voltage sensor signal and a reference voltage representative of the desired tank voltage and generating a tank voltage error signal used as the main component of the real power control signal, and firing and control means actuated by the error voltage in each phase between the cycloconverter reference signal and the sensed instantaneous induced voltage for controlling said input cycloconverter to maintain the tank voltage within the predetermined limits.

10. A cycloconverter system according to claim 9 wherein said phase and amplitude shifter means uses the per phase line voltage as a reference phasor and further includes adjustable input power factor control means so that the generated per phase cycloconverter reference signals control both the real power and input power factor of the input cycloconverter.

11. A cycloconverter system according to claim 9 wherein said phase and amplitude shifter means uses the per phase line voltage as a reference phasor and is further independently controlled in dependence upon the magnitude and polarity of a unidirectional voltage input power factor control signal so that the generated per phase cycloconverter reference signals control both the real power and input power factor of the input cycloconverter.

12. A cycloconverter system according to claim 9 further including current sensing means for sensing the instantaneous load current supplied by said high frequency resonant tank circuit to said output cycloconverter and deriving a sensor signal indicative thereof,
  a first auxiliary feedback circuit which utilizes said load current and tank voltage sensor signals to derive a tank real power output signal representative of the real power output of said tank circuit,
  a second auxiliary feedback circuit which utilizes said load current sensor signal to derive a real load current signal representative of the real component of load current, and
  means for summing said tank voltage error signal with said tank real power output signal and real load current signal and using the summation as the real power control signal.

13. The method of controlling a cycloconverter system including a polyphase cycloconverter in cascade with a high frequency resonant tank circuit and having in each phase an input series filter inductor connectable to a source of low frequency line voltage, said method comprising the steps of
  generating per phase cycloconverter reference signals for controlling at least the real power component and direction of power flow through the cycloconverter in dependence upon the magnitude and polarity of a real power control signal,
  continuously sensing the instantaneous tank voltage and deriving a sensor signal indicative thereof,
  comparing said tank voltage error signal to a reference representative of a desired tank voltage and generating a tank voltage error signal, and using said tank voltage error signal as the real power control signal, and
  controlling said cycloconverter in dependence upon said cycloconverter reference signals to thereby maintain the tank voltage within predetermined limits.

14. The method of claim 13 wherein the generating step further includes generating per phase cycloconverter reference signals for additionally controlling the input power factor of the cycloconverter independently of the real power component and direction of power flow.

15. The method of claim 13 wherein the generating step further includes generating per phase cycloconverter reference signals for additionally controlling the input power factor of the cycloconverter in dependence upon the magnitude and polarity of an input power factor control signal and independently of the real power component and direction of power flow.

16. The method of controlling the input cycloconverter of a high frequency link cycloconverter system including cascaded input and output polyphase cycloconverters linked by a high frequency resonant tank and having in each phase an input series filter inductor connectable to a source of low frequency voltage, said method comprising the steps of
  generating per phase cycloconverter reference signals that are phase and amplitude shifted with respect to the line voltage used as a reference phasor in dependence upon a desired input power factor and in dependence upon the polarity and magnitude of a real power control signal for controlling the real power component and direction of power flow through the input cycloconverter, continuously sensing the instantaneous tank voltage and deriving a sensor signal indicative thereof, summing said tank voltage error signal with a reference voltage representative of a desired tank voltage and generating a tank voltage error signal, and using said tank voltage error signal at least as the main component of the real power control signal, and controlling said input cycloconverter in dependence upon the error voltage in each phase between the generated cycloconverter reference signal and the sensed induced voltage between the filter inductor and input cycloconverter in each phase to thereby control the direct and quadrature components of the induced voltage while maintaining the tank voltage within predetermined limits for both directions of power flow.

17. The method of claim 16 wherein the step of generating per phase cycloconverter reference signals additionally includes controlling the input power factor in dependence upon the polarity and magnitude of an input power factor control signal.

18. The method of claim 16 including the additional steps of continuously sensing the instantaneous load current supplied by the high frequency resonant tank to the output cycloconverter and deriving a sensor signal indicative thereof, using said load current and tank voltage sensor signals to derive a first auxiliary feedback signal representative of the real power output of the tank, using said load current sensor signal to derive a second auxiliary feedback signal representative of the real component of load current, and summing said tank voltage error signal and said first and second auxiliary feedback signals and using the summation as the real power control signal.

19. The method of claim 16 wherein the step of generating per phase cycloconverter reference signals additionally includes manually controlling the input power factor in dependence upon the setting of an input power factor control.

* * * * *